Dec. 1, 1959   L. J. LAPOINTE   2,915,243
PERFORATED RECORD SENSING DEVICE
Filed May 12, 1958

INVENTOR
LLOYD J. LAPOINTE
BY
ATTORNEYS

United States Patent Office 2,915,243
Patented Dec. 1, 1959

2,915,243

PERFORATED RECORD SENSING DEVICE

Lloyd J. Lapointe, Manchester, Conn., assignor to Royal McBee Corporation, Port Chester, N.Y., a corporation of New York Application May 12, 1958, Serial No. 734,783

7 Claims. (Cl. 235—61.11)

This invention relates to perforated record sensing devices; more particularly it relates to perforated record sensing devices having ball sensing elements which are magnetically pulled into electrical circuit closing positions upon encountering perforations in a record.

Many record sensing devices presently in use employ a plurality of spring biased electrical contact brushes disposed adjacent and adapted to ride the surface of a contact record feed roll. Upon encountering perforations in the record, the brushes make electrical contact with the feed roll to establish predetermined circuits. In such devices the contact brushes are subject to wear, and uneven wear when the brushes comprise a bundle of small wires, thereby necessitating periodic adjustment or replacement. Further due to the fact that these brushes comprise a plurality of small wires they are easily damaged during adjustment or replacement. Also their current handling capacity is reduced when they are damaged or unevenly worn thereby rendering the systems employing them unreliable. Another major disadvantage is the fact that records may be driven past the brushes only in one direction. In order to rewind records such as perforated tapes requires the brushes to be lifted from the feed roll, thereby increasing the chances of damage to the brushes, or the tape must be rewound externally of the reader of which the sensing device is a part.

In accordance with the present invention the above disadvantages are overcome in the provision of a record sensing device comprising a plurality of magnetic circuits each including an air gap. Balls of magnetic material are magnetically though movably held in the air gaps in contact with adjacent air gap boundaries to which external circuitry is connected. Records to be sensed are threaded between the balls and one of the adjacent air gap boundaries forcing the balls to ride the surface of the record in an open air gap position. Upon encountering perforations in the record the balls are drawn into closed air gap positions in contact with both air gap boundaries thereby establishing predetermined electrical circuits.

An object of the present invention is to provide an improved record sensing device.

Another object of the invention is the provision of a record sensing device which is rugged and simple in design and constructed for a long reliable life in operation.

Another object of the invention is the provision of a record sensing device which permits passage of a record therethrough in opposite directions.

Still another object of the invention is the provision of a record sensing device having ball sensing elements which are rotatable and translatable in response to record movement thereby eliminating uneven wear thereof through utilization of an infinite number of contact spots around the surfaces of the ball elements.

A further object of the invention is the provision of a record sensing device having rotatable and translatable ball sensing contact elements which render faulty contacts due to foreign matter negligible.

A still further object of the invention is the provision of a record sensing device wherein the contact pressure of the sensing elements is constant thereby establishing dependable circuits.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
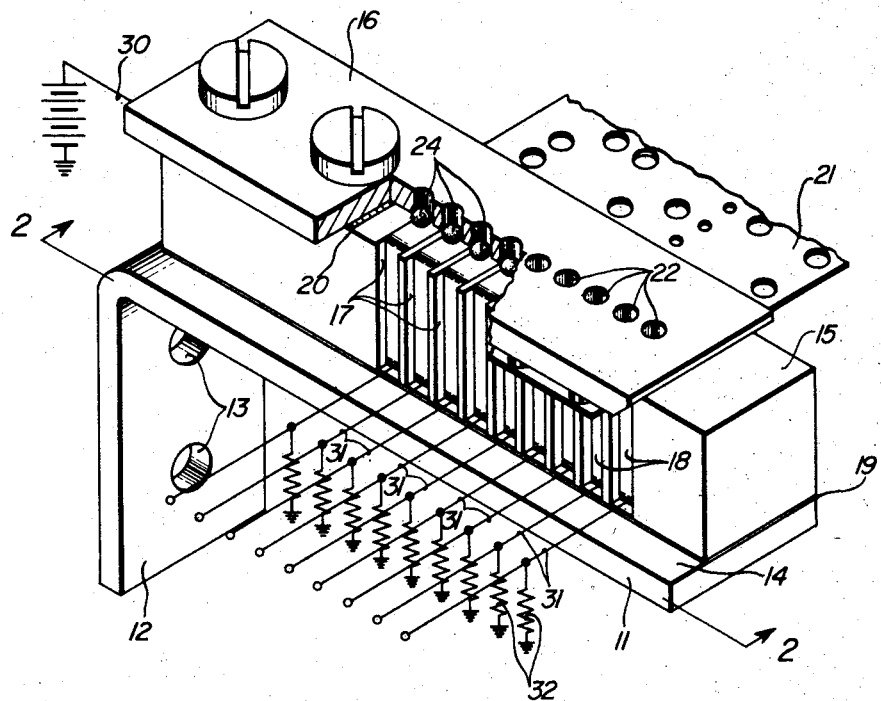
Fig. 1 is a perspective view of the record sensing element.

Referring now to the drawings wherein like reference characters designate like or corresponding parts throughout the several views, there is shown in Fig. 1 (which illustrates a preferred embodiment) a support plate 11 of magnetic material such as steel having a depending leg portion 12 whereby the support plate may be suitably mounted as by screws or rivets through holes 13. The upper surface 14 of plate 11 is adapted to support a magnet retaining block 15 and a steel top plate 16. The block 15 which is formed from a suitable insulating material is provided with slots 17 which are adapted to receive as by press fits permanent magnets 18 made from materials having high permeability and high magnetic retentivity, such as Alnico, treated to make magnets of a high order of stability. It being understood that the number of slots and magnets provided will depend on the number of levels there are in a record to be sensed. Electrical insulating material 19 is provided between the block 15 and the support plate for reasons which will hereinafter appear. As shown in the figures a steel spacer 20 between the block 15 and top plate 16 is provided to space the top plate from the block a predetermined air gap distance sufficient for passage of a record such as a perforated tape 21 therethrough. Spacer 20 will also act as a tape guide.

The top plate is provided with a plurality of circular holes 22 which are adapted to be registered directly over the north ends of the permanent magnets 18 when the top plate, block, and support plate are secured together by steel screws 23. When so secured the screws 23 will contact the top and support plates thereby forming a completely steel flux path between said plates; the whole serving as a U-shaped pole piece providing a common flux path through the screws for the flux emanating from all the magnets. As is apparent from the structure described above a plurality of magnetic circuits are formed with magnetic flux flowing from the north pole of each magnet to its respective south pole across the air gap spacing between the magnets and top plate, into the top plate through the screws 23 and into the support plate, and across the air gap spacing between magnets and support plate provided by insulating material 19 to the south magnetic pole. Balls 24 of magnetic material such as steel and only slightly smaller in diameter than the diameter of the holes 22 on the top plate are placed into the holes and form, as is understood in the art, low reluctance paths for the magnetic flux between magnets and top plate, closing the air gap path between magnets and top plate whereby the balls will assume and be magnetically held in positions in contact with the magnets and the walls of the holes 22 in the top plate.

In accordance with the invention the reluctance of the pole piece and particularly the reluctance of the screws taken together is made low enough so that the fluxes flowing in magnetic circuits whose associated balls are in open air gap position are substantially unaffected by increases in the flux flowing in those magnetic circuits whose air gaps are closed by associated balls.

Conductors 30 and 31 respectively as seen in Fig. 1 are connected by any suitable means e.g. soldering, to any portion of the pole piece and to each of the permanent magnets. Conductor 30 is shown as connected to a D.C. power supply while conductors 31 are connected to ground through load elements illustratively shown as resistors 32. As is understood in the art the load elements may be the set up solenoids of a translator or the signal developed across the resistors 32 may be employed to fire thyratrons having set up solenoids in their plate circuits.

Figure 2:
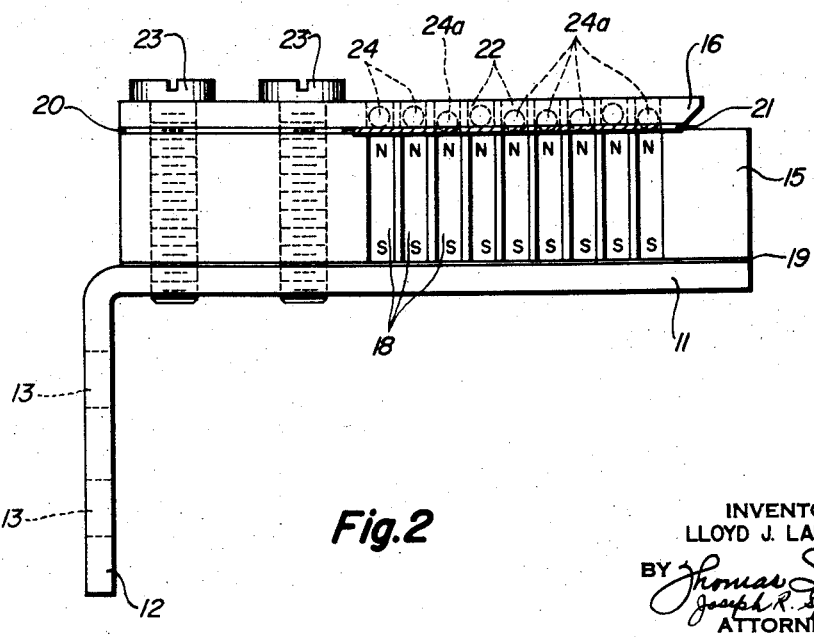
Fig. 2 is a view taken along lines 2—2 of Fig. 1.

When a tape to be sensed is placed between the magnets 18 and the top plate 16 the balls 24 will be pushed up against the force of magnetic attraction between magnets and balls thereby to ride on the tape but remaining magnetically attracted to the walls of the holes in the top plate. The tape therefor opens all the electrical circuits. As the tape is fed past the magnets and a perforated column appears, those balls 24a (Fig. 2) in registry with the holes in the tape will be attracted to their associated magnet and complete an associated circuit whereby curent will flow from source 30 through the top plate 16, balls 24a, magnets 20 and load resistors 32 to ground; the insulating material 19 preventing current flow except through the balls 24a. As the tape is advanced the balls 24a will be cammed up out of the holes in the tape against the force of magnetic attraction and rotated thereby opening their associated circuits. Upon encountering the next column of holes, those balls in registry with perforations will be magnetically pulled into contact with associated magnets thereby completing other circuits corresponding to the hole combination in said next column of the tape. As is apparent when the balls are moved they present new contact points thereby preventing uneven wear.

As is understood in the art the tape 21 will be pulled through the sensing device by suitable drive means. If it is desired to rewind the tape all that need be done is to open line 30 and reverse the direction of the tape drive means.

While magnetic pole pieces comprising the top and support plates and screws have been disclosed as being of conductive magnetic material it is to be understood that non conductive magnetic materials known as "Ferrites" may also be employed thereby eliminating the necessity for electrical insulating material 19. Where non conductive ferrite materials are so employed conductive material such as copper may be plated on the ferrite at appropriate places to which conductor 30 may be connected.

It is to be further understood that the pole piece comprising the top plate 16 screws 23 and support plate 11 is formed as described to eliminate the necessity for close tolerances in machining to provide proper air gap spacing and to enable easy disassembly. Otherwise the pole piece could comprise a single sheet of steel formed in the shape of a U, thereby eliminating the necessity for screws to provide an iron flux path.

It should be understood therefore that the foregoing disclosure relates only to a preferred embodiment of the invention and that it is intended to cover all changes and modifications of the example of the invention herein chosen for the purpose of the disclosure, which do not constitute departures from the spirit and scope of the invention.

The invention claimed is:

1. A device for sensing the presence or absence of perforations in a perforated record comprising a magnetic circuit having an air gap, movable means magnetically retained in said air gap, circuitry connected to either side of said air gap, said means adapted to be moved between closed and open air gap positions thereby to connect and disconnect said circuitry in response to the presence or absence of perforations in a record adapted to move relative to said magnetic circuit through said air gap, said means being mechanically forced to disconnect position by said record when no perforation is passing through said air gap and magnetically forced to connect position when a perforation is passing through said air gap.

2. An apparatus for sensing perforated records comprising a magnetic circuit including an air gap, said record being adapted to be moved relative to said air gap whereby perforations therein are sensed, a ball element in said air gap adapted to move from open to closed air gap position upon registry with a perforation in said record, circuit means, and means for energizing said circuit means when said ball element is in closed air gap position.

3. A device for sensing records having data items perforated in parallel columns across the shorter dimension thereof comprising a plurality of magnetic circuits each including an air gap aligned transverse to the direction of record movement, the number of said circuits corresponding to the number of rows in a record column, said record being adapted to move relative to said magnetic circuits through said air gaps, a plurality of magnetic elements disposed in said air gaps adapted to be moved from open to closed air gap positions upon registration with columnar perforations in said record, said elements in closed air gap positions establishing current paths across said air gaps, and means for sending current through said paths to utilization devices.

4. A device for sensing records having data items perforated in parallel columns across the shorter dimension thereof comprising a plurality of discrete magnetic circuits each including an air gap, said magnetic circuits being arrayed in a line such that said air gaps are adjacent one another in a common plane, said record being adapted to move past said array of magnetic circuits through said air gaps, magnetic ball contact elements in said air gaps adapted to be moved from open to closed air gap positions upon encountering perforations in a tape, and circuitry connected to said air gap boundaries adapted to be energized when said elements are in closed air gap positions.

5. In an apparatus for sensing records having perforations therein, a sensing station comprising a magnetic circuit having an air gap, a magnetic element in said air gap normally in contact with the boundaries of said air gap, circuit means connected to said air gap boundaries, said record being adapted to move relative to said air gap between said element and an air gap boundary, whereby said element will be pulled into closed air gap position upon registry with perforations in said record and forced into open air gap position by said record when said perforations move out of registry with said element, said circuit means adapted to be energized when said element is in closed air gap position.

6. A perforated record sensing device comprising a magnet and associated pole piece, an air gap between said magnet and pole piece, a ball sensing element magnetically retained in said air gap in contact with said magnet and pole piece, said record to be sensed being adapted to move relative to said air gap between said magnet and element whereby said element is moved from closed air gap position by the record against the force of magnetic attraction and into closed air gap position by the force of magnetic attraction when a hole in the record in passing through said air gap, circuit means connected to said magnet and pole piece, and means for energizing said circuit means when said element is in closed air gap position.

7. A device for sensing records having data items perforated in parallel columns across the shorter dimension thereof comprising a plurality of magnets arranged in a column, a pole piece having a plurality of holes therein, means securing said magnets and pole piece in spaced relation and with said holes in registry over the north poles of said magnets, a plurality of ball elements in said holes magnetically held in contact with the magnets and the walls of the holes in said pole piece, and circuitry connected to said pole piece and said magnets, said record being adapted to move relative to said device between magnets and ball elements whereby there will be conditions of registration and non registration of said ball elements with the perforations in said record, said ball elements in registration with perforations being pulled into contact with said magnets thereby completing said circuitry.

References Cited in the file of this patent
UNITED STATES PATENTS

| | | |
|---|---|---|
| 2,265,462 | Weitmann | Dec. 9, 1941 |
| 2,782,989 | Knox | Feb. 26, 1957 |